(12) United States Patent
Shetty et al.

(10) Patent No.: US 12,536,543 B2
(45) Date of Patent: Jan. 27, 2026

(54) SYSTEM AND METHOD FOR SUSPENDING ACCESS TO ACCOUNTS DUE TO INCAPACITY OF USER

(71) Applicant: Mastercard International Incorporated, Purchase, NY (US)

(72) Inventors: Kaushal Naveen Shetty, Thane (IN); Sachin Kumar Singh, Pune (IN); Venkata Satya Sivajee Pinnamaneni, Dardenne Prairie, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/363,787

(22) Filed: Aug. 2, 2023

(65) Prior Publication Data

US 2025/0045760 A1 Feb. 6, 2025

(51) Int. Cl.
*G06Q 20/40* (2012.01)
(52) U.S. Cl.
CPC ................ *G06Q 20/4016* (2013.01)
(58) Field of Classification Search
CPC .............................................. G06Q 20/4016
USPC ........................................................ 705/3–44
See application file for complete search history.

(56) References Cited

U.S. PATENT DOCUMENTS

| | | | | |
|---|---|---|---|---|
| 9,601,000 | B1 * | 3/2017 | Gruss | G06F 21/552 |
| 10,610,111 | B1 * | 4/2020 | Tran | A61B 8/565 |
| 11,037,160 | B1 * | 6/2021 | Kolls | G06Q 20/4016 |
| 11,037,231 | B1 * | 6/2021 | Barakat | G06F 21/45 |
| 2007/0067238 | A1 * | 3/2007 | Rabson | G06Q 20/102 |
| | | | | 705/40 |
| 2015/0170148 | A1 * | 6/2015 | Priebatsch | G06Q 20/386 |
| | | | | 705/44 |
| 2015/0279155 | A1 * | 10/2015 | Chun | G06Q 20/4016 |
| | | | | 463/25 |
| 2016/0012445 | A1 * | 1/2016 | Villa-Real | G06Q 20/4016 |
| | | | | 705/44 |
| 2018/0176727 | A1 * | 6/2018 | Williams | A61B 5/6802 |
| 2019/0099114 | A1 * | 4/2019 | Mouradian | A61B 5/681 |

(Continued)

OTHER PUBLICATIONS

Michael B. del Rosario et al., "Tracking the Evolution of Smartphone Sensing for Monitoring Human Movement", Sensors ISSN 1424-8220, mdpi.com/journal/sensors (Year: 2015).*

(Continued)

*Primary Examiner* — Frantzy Poinvil
(74) *Attorney, Agent, or Firm* — Hovey Williams LLP

(57) ABSTRACT

A system and method for reducing financial fraud by suspending access to financial accounts due to a user's incapacitation. A fall detection alert is received from a device worn or carried by the user, and first status values are recorded. After a pre-established period of time, second status values are recorded, and the first and second status values are compared. An incapacitation of the user is inferred if the second status values are within a pre-established range of the first status values, and access to the accounts is suspended for at least some purchases based on this inferred incapacitation. Prior to suspending access, a notification may be sent to the user to allow the user to act to avoid the suspension. Access to the accounts may not be suspended for medical or other relevant purchases. Subsequent to suspending access, the user may request and access may be reinstated.

20 Claims, 3 Drawing Sheets

(56) References Cited

U.S. PATENT DOCUMENTS

| | | | |
|---|---|---|---|
| 2020/0202425 A1* | 6/2020 | Taylor-Shoff | G06Q 40/03 |
| 2020/0211075 A1* | 7/2020 | Kumar | G06F 3/0346 |
| 2020/0242615 A1* | 7/2020 | Chandra | G06F 16/9024 |
| 2021/0383408 A1* | 12/2021 | VanLoo | G16H 40/67 |

OTHER PUBLICATIONS

Saha et al., "Patient Monitoring Framework for Smart Home Using Smart Handhelds", Dept. of Computer Science and Engineering, Jadvpur University, Kolkata, India, IEEE WiSPNET (Year: 2017).*

* cited by examiner

SYSTEM AND METHOD FOR SUSPENDING ACCESS TO ACCOUNTS DUE TO INCAPACITY OF USER

FIELD OF THE DISCLOSURE

The present invention relates to systems and methods for detecting and preventing financial fraud, and more particularly, embodiments concern a system and method for reducing financial fraud by inferring an incapacitating event and an inability of a user to monitor and manage their financial accounts and, based thereon, suspending access to the financial accounts until the user confirms their ability to resume monitoring and managing the financial accounts.

BACKGROUND OF THE DISCLOSURE

It sometimes happens that a person experiences an injury event in which the person falls, is unable to rise, and perhaps loses consciousness. Unfortunately, another person may take advantage of such a situation and steal the injured person's mobile phone and/or financial cards and use them to make fraudulent purchases from merchants using contactless pay technologies and/or card-based transactions without the injured person's knowledge. Because the injured person is temporarily unable to monitor and manage their financial accounts, such fraud is difficult to detect and prevent.

This background discussion is intended to provide information related to the present invention which is not necessarily prior art.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

Embodiments address the above-described and other problems and limitations by providing a system and method for reducing financial fraud by inferring an incapacitating event and an inability of a user to monitor and manage their financial accounts and, based thereon, suspending access to the financial accounts until the user confirms their ability to resume monitoring and managing the financial accounts.

In a first embodiment, a system is provided for reducing financial fraud. The system may include a registration module, a fall detection module, and a smart blocker module. The registration module may be configured to receive and store account information for one or more financial accounts of a user. The fall detection module, which may be provided in a smart watch or other device worn or carried by the user, may be configured to generate an electronic fall detection alert and one or more first status values of the user. The smart fraud detection module, which may be provided in the smart watch or in a smart phone of the user, may be configured to receive the electronic fall detection alert, record the one or more first status values of the user, wait a pre-established period of time, and record one or more second status values from the fall detection module after the pre-established period of time. The smart fraud detection module may include a confirmation module and a payment blocker module. The confirmation module may be configured to compare the one or more second status values to the one or more first status values and infer an incapacitation of the user when the one or more second status values are within a pre-established range of the one or more first status values (i.e., the user's status has not sufficiently changed since the initial event). The payment blocker module may be configured to suspend access to the one or more financial accounts for at least some purchases based on the incapacitation of the user.

Various implementations of the first embodiment may include any one or more of the following features. The one or more financial accounts may be contactless payment accounts, digital currency accounts, credit card accounts, bank accounts, and/or investment accounts. The one or more first status values and the one or more second status values may include orientation, movement, and/or location values. The one or more first status values and the one or more second status values may include one or more vital sign values. The pre-established period of time may be between thirty seconds and two minutes. The pre-established range may be one or more standard deviations of the first status values. The smart fraud detection module may be further configured to, prior to suspending access to the one or more financial accounts, send a notification to the user that access will be suspended, and not suspend access to the one or more financial accounts when a response is received from the user and the response from the user is authenticated. The payment blocker module may be configured to not suspend access to the one or more financial accounts for medical purchases. The smart fraud detection module may be further configured to, subsequent to suspending access to the one or more financial accounts, receive a request from the user to allow access to the financial accounts and allow access to the financial accounts when the request from the user is authenticated.

In a second embodiment, a method is provided for reducing financial fraud. The method may include the following steps. A user may be registered, including receiving from the user account information for one or more financial accounts. An electronic fall detection alert may be received from, e.g., a smart watch or other device worn or carried by the user. One or more first status values of the user may be recorded by, e.g., the smart watch or a smart phone of the user. A pre-established period of time may be waited. One or more second status values may be recorded after the pre-established period of time. The one or more second status values may be compared to the one or more first status values, and an incapacitation of the user may be inferred when the one or more second status values are within a pre-established range of the one or more first status values (i.e., the user's status has not sufficiently changed since the initial event). Access to the one or more financial accounts may be suspended for at least some purchases based on the incapacitation of the user.

Various implementations of the second embodiment may include any one or more of the following features. The one or more financial accounts may be contactless payment accounts, digital currency accounts, credit card accounts, bank accounts, and/or investment accounts. The one or more first status values and the one or more second status values may include orientation, movement, and/or location values. The one or more first status values and the one or more second status values may include one or more vital sign values. The pre-established period of time may be between thirty seconds and two minutes. The pre-established range may be one or more standard deviations of the first status values. The method may further include, prior to suspending access to the one or more financial accounts, sending a notification to the user that access will be suspended, and not suspending access to the one or more financial accounts when a response is received from the user and the response from the user is authenticated. Access to the one or more financial accounts may not be suspended for medical purchases. The method may further include, subsequent to suspending access to the one or more financial accounts, receiving a request from the user to allow access to the financial accounts, and allowing access to the financial accounts when the request from the user is authenticated.

This summary is not intended to identify essential features of the present invention and is not intended to be used to limit the scope of the claims. These and other aspects of the present invention are described below in greater detail.

DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
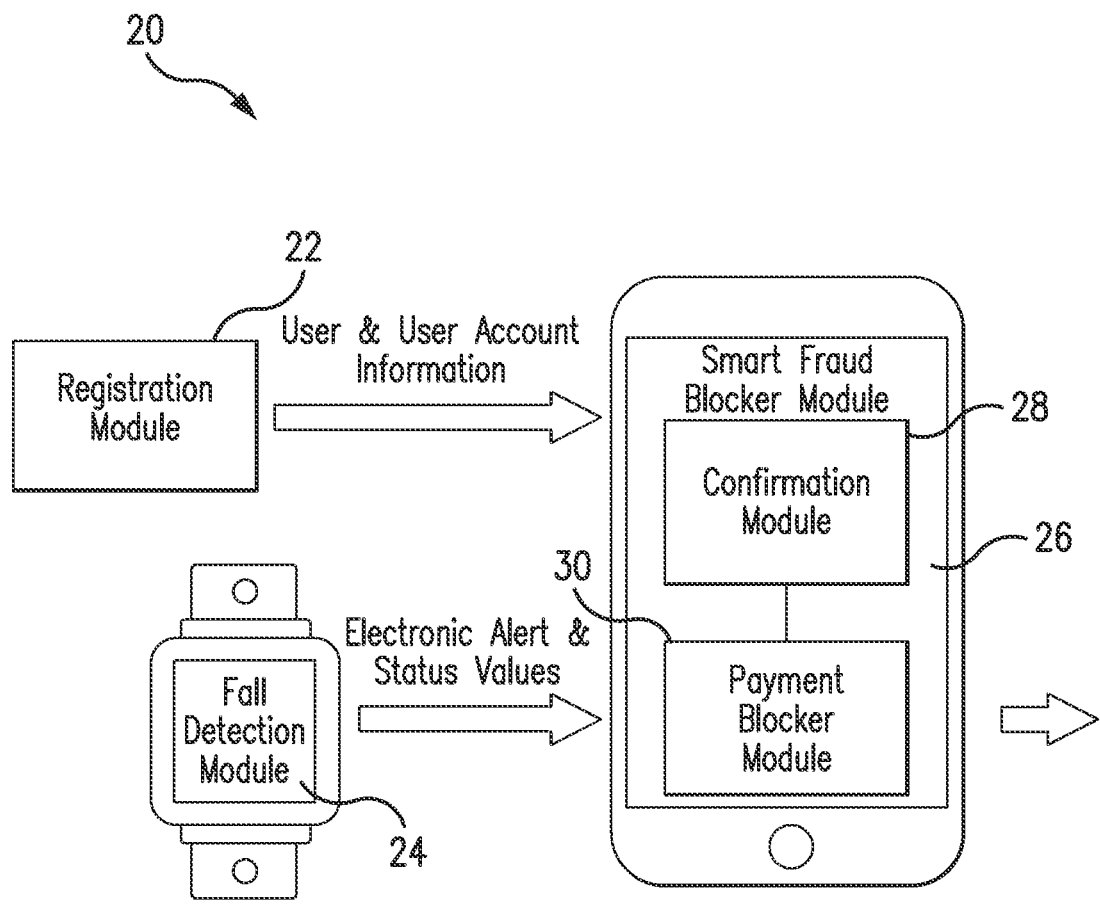
FIG. 1 is a high-level block diagram of an embodiment of a system for reducing financial fraud when a user is incapacitated.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized, and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, structure, act, etc. described in one embodiment may also be included in other embodiments but is not necessarily included. Thus, particular implementations of the present invention can include a variety of combinations and/or integrations of the embodiments described herein.

Broadly, embodiments provide a system and method for reducing financial fraud by inferring an incapacitating event and an inability of a user to monitor and manage their financial accounts and, based thereon, suspending access to the financial accounts until the user confirms their ability to resume monitoring and managing the financial accounts.

In an example embodiment, a potential fall, accident, injury, or other incapacitating event may be initially detected by the user's smart watch or other wearable or carried device, and one or more first status values (e.g., orientation, movement, and/or location values and/or one or more vital sign values) may be recorded. After a pre-established period of time, a current one or more second status values may be recorded and compared to the first values. If the comparison of status values indicates that the user has not moved or otherwise recovered, then the incapacity of the user may be inferred. Once incapacity is inferred, the user's inability to monitor and manage their financial accounts may be assumed, and access to the financial accounts may be suspended until the user confirms their ability to resume monitoring and managing their financial accounts. Thus, embodiments advantageously integrate the user's medical status with account access automatically and in real-time.

Figure 2:
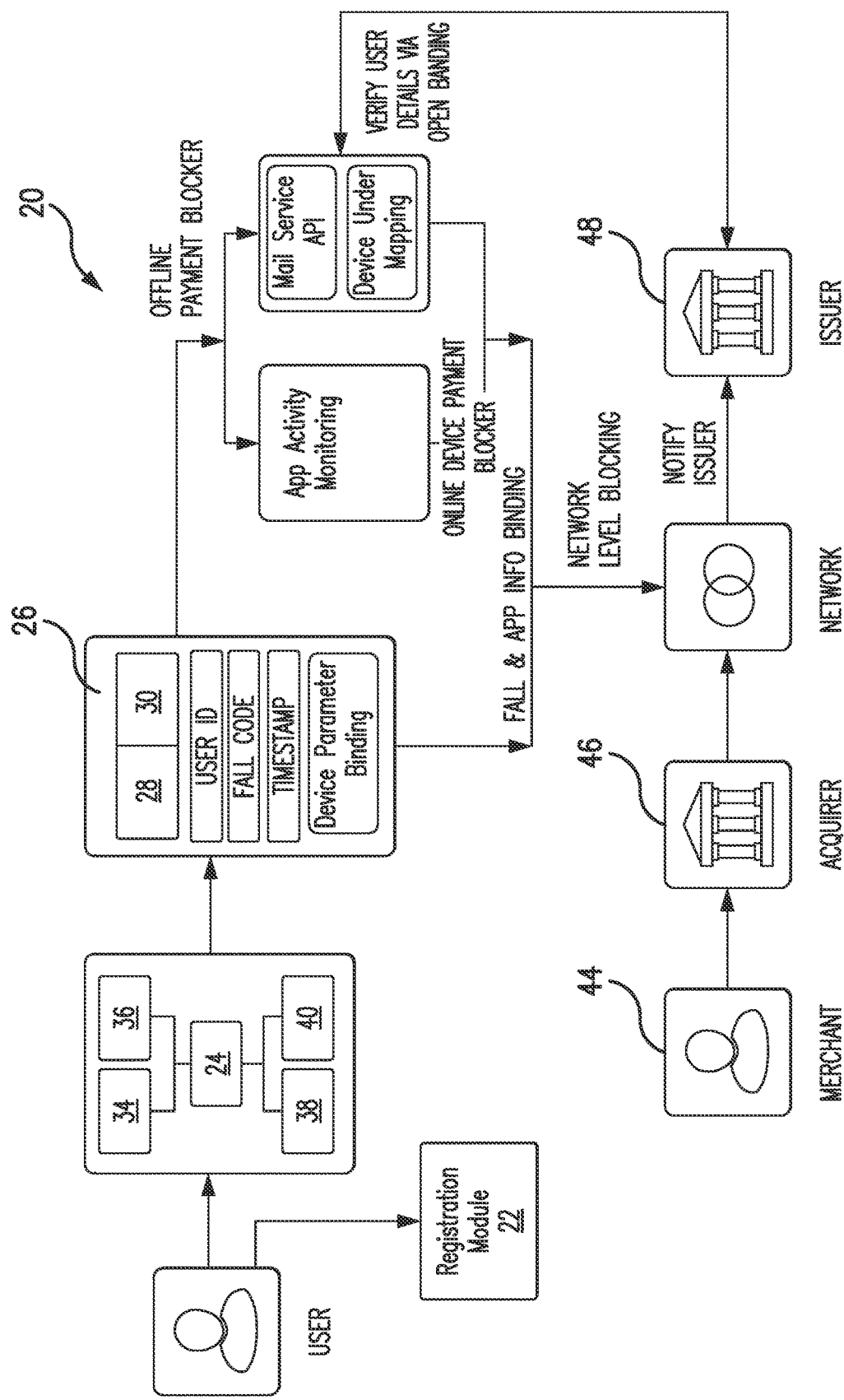
FIG. 2 is a block diagram of an example implementation of the system of FIG. 1.

Referring to FIGS. 1 and 2, an embodiment of a system 20 for reducing financial fraud is shown. If a fall, accident, injury, or other incapacitation event is detected and confirmed, the system 20 advantageously helps to protect next-generation digital consumers by reducing fraud via their mobile devices, financial cards, or any other ecommerce financial accounts. The system 20 may broadly include a registration module 22, fall detection module 24 and a smart fraud blocker module 26. The smart fraud blocker module 26 may further include a confirmation module 28 and a payment blocker module 30. In one implementation, the function of the system 20 may be reflected in the steps of the method 120 described below and may include any additional features described in association with method 120.

The registration module 22 may be configured to facilitate the user registering with the smart fraud blocker module 26 and activating the fraud prevention function, including providing information for one or more financial accounts that the user wishes to protect from fraud in the event of incapacitation. The one or more financial accounts may include substantially any financial account for making purchases, such as contactless payment accounts, credit card accounts, digital currency accounts, bank accounts, and/or investment accounts.

The fall detection module 24 may be configured to detect the fall, accident, injury, or other incapacitation event and to output an electronic alert to one or more emergency contacts. The fall detection module 24 may be implemented as a device worn or carried by the user, such as a smart watch, smart health band, or other wearable device or a smart phone. The fall detection module 24 may employ substantially any suitable technology for detecting a fall or other relevant physical or medical event, such as technology for detecting a status of the user with regard to, e.g., orientation, movement, and/or location. For example, an orientation value may be provided by a gyroscopic information module 34, an orientation value may be provided by a magnetometer module 36 detecting a change in orientation relative to Earth's magnetic field, an acceleration value in one or more axes may be provided by an accelerometer module 38, and a location value may be provided by a global positioning system (GPS) or other location-determining technology module 40. In one implementation, the fall detection module 24 may be further configured to detect one or more vital sign values (e.g., body temperature, pulse rate, respiration rate, blood pressure) of the user.

The smart fraud blocker module 26 may be configured to receive the electronic alert from the fall detection module 24, confirm the user's incapacitation, and initiate the suspension of access to one or more of the user's financial accounts. The smart fraud blocker module 26 may be implemented as a software application ("app") on the user's smart watch, smart phone, or other device. In one implementation, the smart fraud blocker module 26 may receive the electronic alert and receive and record one or more first status values of the user (e.g., orientation, movement, and/or location values and or one or more vital sign values) from the fall detection module 24 via an application interface (API). The smart fraud blocker module 26 may then wait a pre-established period of time to allow the user time to demonstrate that they are not, in fact, incapacitated. In various implementations, the pre-established period of time may be fixed, changeable, and/or selectable by the user, and may be between thirty seconds and two minutes. At the end of the pre-established period of time, the smart fraud blocker module 26 may receive and record one or more second status values for the user (e.g., orientation, movement, and/or location values and or one or more vital sign values).

The confirmation module 28 may be configured to compare the second status values to the first status values. If the second status values are outside of a pre-established range, which may be one or more standard deviations of the first values, and therefore sufficiently different to indicate that the user has changed orientation or location or is otherwise active so as to support an inference that the user either did not fall or was otherwise incapacitated or has recovered, then no action may be taken. A standard deviation is a measure of an amount of variation of a set of values, such as the first status values. Thus, one or more standard deviations may be pre-established for various types of falls detected and indicated in the electronic alert from the fall detection module 24. If the status values are within the pre-established range and therefore sufficiently similar to indicate that the user has not changed orientation or is not otherwise active so as to support an inference that the user did fall or is otherwise incapacitated, then action may be taken to protect the user's accounts from unauthorized activity.

The payment blocker module 30 may be configured to take action to protect the user's accounts from unauthorized activity if the second status values are sufficiently similar to the first status values (e.g., the user has not changed orientation or location or is not otherwise active) to indicate that the user did fall or is otherwise incapacitated. In one implementation, the payment blocker module 30 may send a notification to the user that access will be suspended prior to suspending access to the one or more financial accounts, and access to the one or more financial accounts may not be suspended when a response (e.g., entry of a personal identification number or password) is received from the user and the response from the user is authenticated. In particular, access to the one or more financial accounts may be suspended for at least some purchases. In one implementation, this may include notifying a payment network or a card issuer to suspend use of a financial card.

For example, as seen in FIG. 2, the payment blocker module 30 may initiate both offline payment blocking and network level blocking. In more detail, access to certain kinds of accounts (e.g., contactless payment apps and/or digital wallets, such as Apple Pay, Google Pay, or Samsung Pay) may not be suspended unless and until a transaction is attempted following the incapacitation event. However, a network level block may be immediately implemented between the merchant 44 and/or a card acquirer 46 and a card issuer 48 from the event timestamp forward for the user's mobile device for the account. In one implementation, access to the one or more financial accounts is not suspended for healthcare or other medical purchases. More specifically, transactions associated with certain merchant category codes (MCCs), such as casinos, may be suspended, while transactions associated with other MCCs, such as healthcare providers, may be allowed.

Subsequently, the smart fraud blocker module 26 may receive a request from the user to remove the suspension and allow access to the financial accounts, and access to the financial accounts may be allowed when the request from the user is authenticated.

In one implementation, the suspension of access may involve mapping the user's primary account numbers (PANs), device(s), payment app activity, and digital identity with one or more Issuers or other institutions and updating the network to block transaction involving these PANs. In more detail, the payment blocker module 30 may fetch the user device ID, fall code, timestamp, device parameter details (for tap-and-pay accounts), block any tap-and-pay transaction coming from this mobile phone user ID associated with financial card accounts, notify the card issuer(s) that any transactions coming from the user's PANs should be blocked, and communicate the same notification to the network for other transactions. The payment blocker module 30 may cause any transaction using non-registered cards or other accounts to be flagged as well. The payment blocker module 30 may initiate activity monitoring to identify any payment app being used immediately after the user's fall or other incapacitation event. The payment blocker module 30 may trigger continuous polling of the user's registered email transaction alert API and short message service (SMS) app to detect any transaction request being made offline (i.e., a card present transaction in which the stolen card is being used at a merchant retail store), and may push app-based payments to the issuer(s) to flag these payments.

Figure 3:
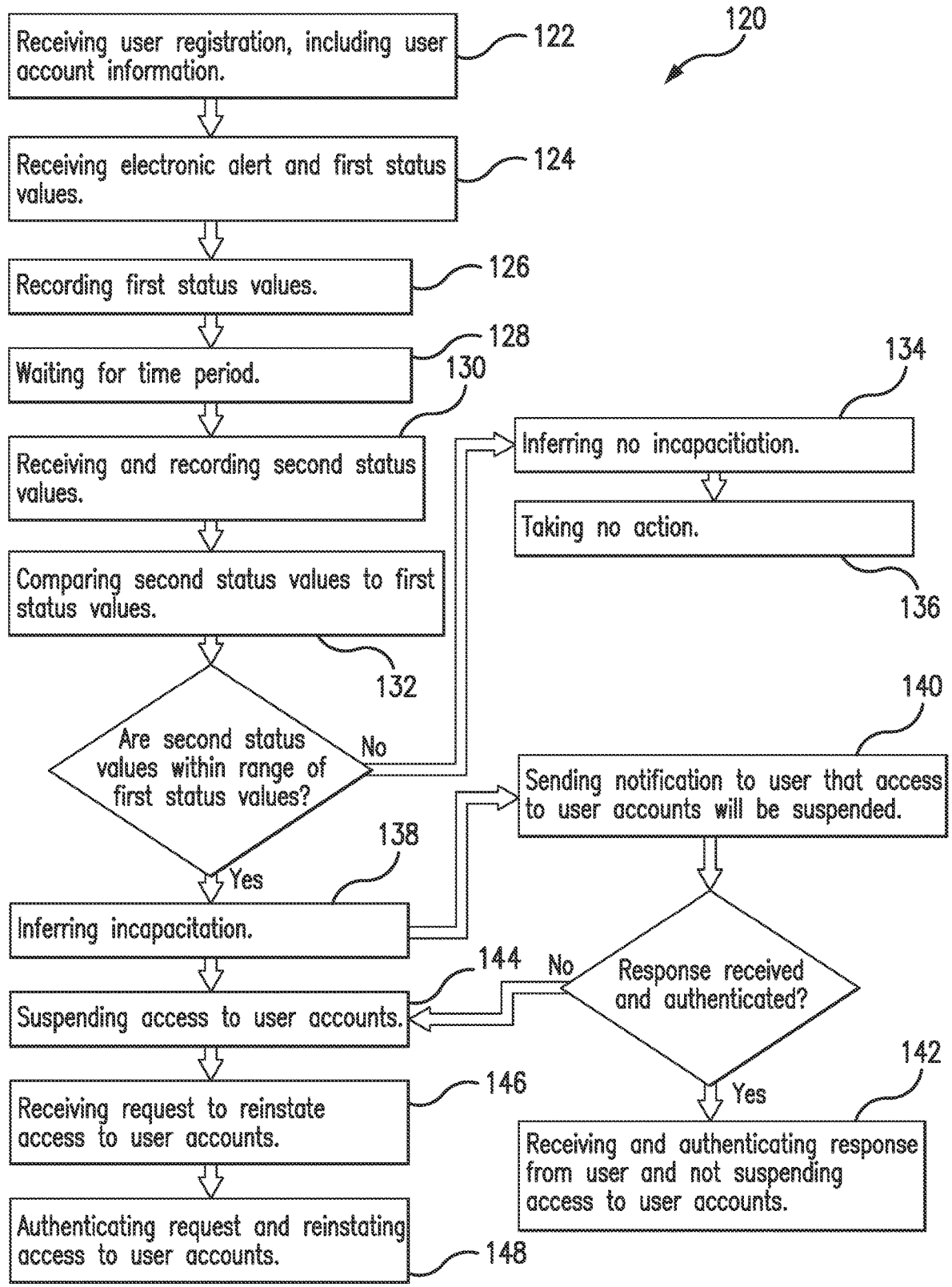
FIG. 3 is a flowchart of an embodiment of a method for reducing financial fraud when a user is incapacitated.

Referring also to FIG. 3, an embodiment of a method 120 for reducing financial fraud is shown. In the event a fall, accident, injury, or other incapacitating event is detected and confirmed, the method 120 advantageously helps to protect next-generation digital consumers by reducing fraud via their mobile devices, financial cards, or any other ecommerce financial accounts. In one implementation, the steps of the method 120 may be performed by the components of the system 20 described above and may include any additional features described in association with the system 20. The method 120 may broadly include the following steps.

A user may be registered, including receiving from the user account information for one or more financial accounts, as shown in step 122. The one or more financial accounts may include substantially any financial account for making purchases, such as a contactless payment account, a credit card account, a digital currency account, a bank account, and/or an investment account.

A fall detection alert may be received from a device worn or carried by the user (e.g., a smart watch, smart health band, or other wearable device or a mobile phone), as shown in 124. The device may be of a type configured to detect a fall or other relevant physical or medical event and to output an electronic alert to one or more emergency contacts. One or more first status values (e.g., orientation, movement, and/or location values and or one or more vital sign values) of the user may be recorded, as shown in 126. A pre-established period of time may be waited to allow the user time to demonstrate that they are not, in fact, incapacitated, as shown in 128. The pre-established period of time may be fixed, changeable, and/or selectable by the user, and may be between thirty seconds and two minutes.

One or more second status values (e.g., orientation, movement, and/or location values and or one or more vital sign values) may be recorded after the pre-established period of time, as shown in 130. In one implementation, the first status values and the second status values may be orientation, movement, and/or location values. For example, an orientation value may be provided by a gyroscope, an orientation value may be provided by a magnetometer detecting a change in orientation relative to Earth's magnetic field, an acceleration value in one or more axes may be provided by accelerometer, and a location value may be provided by GPS or other location-determining technology. Additionally or alternatively, the first status values and the second status values may be or include vital sign values, such as body temperature, pulse rate, respiration rate, blood pressure.

The one or more second status values may be compared to the one or more first status values, as shown in 132. No incapacitation of the user may be inferred when the one or more second status values are sufficiently different to the one or more first status values, as shown in 134, in which case no action is taken, as shown in 136. If the status values are outside of a pre-established range and therefore sufficiently different to indicate that the user has changed orientation or is otherwise moving so as to support an inference that the user either did not fall or was otherwise incapacitated or has recovered, then no action is taken.

An incapacitation of the user may be inferred when the one or more second status values are sufficiently similar to the one or more first status values, as shown in 138. If the status values are within a pre-established range and therefore sufficiently similar to indicate that the user has not changed orientation or is not otherwise moving so as to support an inference that the user did fall or is otherwise incapacitated, then action is taken to protect the user's accounts from unauthorized activity. In one implementation, a notification may be sent to the user that access will be suspended prior to suspending access to the one or more financial accounts, as shown in 140, and access to the one or more financial accounts may not be suspended when a response (e.g., entry of a personal identification number or password) is received from the user and the response from the user is authenticated, as shown in 142.

Access to the one or more financial accounts may be suspended for at least some purchases, as shown in 144. In one implementation, this may include notifying a payment network or a card issuer to suspend use of a financial card. Additionally or alternatively, for certain kinds of accounts (e.g., contactless payment apps and/or digital wallets, such as Apple Pay, Google Pay, or Samsung Pay) access may not be suspended unless and until a transaction is attempted following the incapacitation event. A block may be immediately implemented from that timestamp forward for the user's mobile device for the account. In one implementation, access to the one or more financial accounts is not suspended for healthcare or other medical purchases. In more detail, transactions associated with certain MCCs, such as casinos, may be suspended, while transactions associated with other MCCs, such as healthcare providers, may be allowed. Subsequently, a request may be received from the user to allow access to the financial accounts, as shown in 146. Access to the financial accounts may be allowed when the request from the user is authenticated, as shown in 148.

Additional Considerations

All terms used herein are to be broadly interpreted unless otherwise stated. For example, the term "financial card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "user" may refer to the owner or rightful possessor of a financial card. As used herein, the term "user account" may refer specifically to a PAN or more generally to an account a user has with the financial card issuer and that the PAN is or was associated with. As used herein, the term "merchant" may refer to a business, a charity, or any other entity that can generate transactions with a user account through a transaction card network.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Computer hardware components, such fall detection modules, gyroscopic information modules, magnetometer modules, accelerometer modules, global positioning system (GPS) or other location-determining technology modules, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

The invention claimed is:

1. A system for reducing financial fraud, the system comprising:
   a registration module receiving and storing account information for one or more financial accounts of a user;
   a fall detection module worn by the user, the fall detection module including one or more sensors selected from the group consisting of an accelerometer, a magnetometer, and a vital sign sensor, the one or more sensors detecting an incapacitation event associated with the user and, based on detecting the incapacitation event, the fall detection module generating an electronic fall detection alert and one or more first status values of the user;
   a smart fraud detection module receiving the electronic fall detection alert, recording the one or more first status values of the user, waiting a pre-established period of time, and recording one or more second status values from the fall detection module after the pre-established period of time, the smart fraud detection module including—
      a confirmation module comparing the one or more second status values to the one or more first status values and inferring an incapacitation of the user when the one or more second status values are within a pre-established range of the one or more first status values; and
      a payment blocker module suspending access to the one or more financial accounts for at least some purchases based on the incapacitation of the user.

2. The system of claim 1, wherein the one or more financial accounts are selected from the group consisting of: contactless payment accounts, digital currency accounts, credit card accounts, bank accounts, and investment accounts.

3. The system of claim 1, wherein the one or more first status values and the one or more second status values are selected from the group consisting of: orientation values, movement values, and location values.

4. The system of claim 1, wherein the one or more first status values and the one or more second status values include one or more vital sign values.

5. The system of claim 1, wherein the pre-established period of time is between thirty seconds and two minutes.

6. The system of claim 1, wherein the pre-established range is a standard deviation of the first status values.

7. The system of claim 1, the smart fraud detection module, prior to suspending access to the one or more financial accounts, sending a notification to the user that access to the one or more financial accounts will be suspended, and not suspending access to the one or more financial accounts when a response is received from the user and the response from the user is authenticated.

8. The system of claim 1, the payment blocker module not suspending access to the one or more financial accounts for medical financial transactions.

9. The system of claim 1, the smart fraud detection module, subsequent to suspending access to the one or more financial accounts, receiving a request from the user to allow access to the financial accounts and allowing access to the financial accounts when the request from the user is authenticated.

10. A method for reducing financial fraud, the method comprising:
   registering a user including receiving, from the user, account information for one or more financial accounts;
   detecting, by one or more sensors selected from the group consisting of an accelerometer, a magnetometer, and a vital sign sensor, an incapacitation event associated with the user, wherein the one or more sensors are included in a device worn by the user;

based on detecting the incapacitation event, receiving an electronic fall detection alert from the device worn by the user;
recording one or more first status values of the user;
waiting a pre-established period of time;
recording one or more second status values after the pre-established period of time;
comparing the one or more second status values to the one or more first status values;
inferring an incapacitation of the user when the one or more second status values are within a pre-established range of the one or more first status values; and
suspending access to the one or more financial accounts for at least some purchases based on the incapacitation of the user.

11. The method of claim 10, wherein the one or more financial accounts are selected from the group consisting of: contactless payment accounts, digital currency accounts, credit card accounts, bank accounts, and investment accounts.

12. The method of claim 10, wherein the one or more first status values and the one or more second status values are selected from the group consisting of: orientation values, movement values, and location values.

13. The method of claim 10, wherein the one or more first status values and the one or more second status values include one or more vital sign values.

14. The method of claim 10, wherein the pre-established period of time is between thirty seconds and two minutes.

15. The method of claim 10, wherein the pre-established range is a standard deviation of the first status values.

16. The method of claim 10, further including, prior to suspending access to the one or more financial accounts, sending a notification to the user that access to the one or more financial accounts will be suspended, and not suspending access to the one or more financial accounts when a response is received from the user and the response from the user is authenticated.

17. The method of claim 10, wherein access to the one or more financial accounts is not suspended for medical financial transactions.

18. The method of claim 10, further including, subsequent to suspending access to the one or more financial accounts, receiving a request from the user to allow access to the financial accounts, and allowing access to the financial accounts when the request from the user is authenticated.

19. A method for reducing financial fraud, the method comprising:
registering a user including receiving, from the user, account information for one or more financial accounts;
detecting, by one or more sensors selected from the group consisting of an accelerometer, a magnetometer, and a vital sign sensor, an incapacitation event associated with the user, wherein the one or more sensors are included in a device worn by the user;
based on detecting the incapacitation event, receiving an electronic fall detection alert from the device worn by the user;
recording one or more first status values of the user;
waiting a pre-established period of time;
recording one or more second status values after the pre-established period of time;
comparing the one or more second status values to the one or more first status values;
inferring an incapacitation of the user when the one or more second status values are within a pre-established range of the one or more first status values, wherein the pre-established range is a standard deviation of the first status values;
suspending access to the one or more financial accounts for at least some purchases based on the incapacitation of the user, wherein access to the one or more financial accounts is not suspended for medical financial transaction; and
subsequent to suspending access to the one or more financial accounts, receiving a request from the user to allow access to the financial accounts, and allowing access to the financial accounts when the request from the user is authenticated.

20. The method of claim 19, wherein—
the one or more financial accounts are selected from the group consisting of: contactless payment accounts, digital currency accounts, credit card accounts, bank accounts, and investment accounts;
the one or more first status values and the one or more second status values are selected from the group consisting of: orientation values, movement values, and location values; and
the pre-established period of time is between thirty seconds and two minutes.

* * * * *